United States Patent [19]

Beiswenger et al.

[11] 4,333,493
[45] Jun. 8, 1982

[54] CARTRIDGE FEEDER FOR SOLUBLE FERTILIZER

[75] Inventors: John L. Beiswenger, Libertyville, Ill.; Howard R. Moon, Fort Atkinson, Wis.; Dhananjay V. Chaphalkar, Lindenhurst; Frank A. Smiesko, McHenry, both of Ill.

[73] Assignee: Acme Burgess, Inc., Grayslake, Ill.

[21] Appl. No.: 134,952

[22] Filed: Mar. 28, 1980

[51] Int. Cl.³ .............................................. B05B 7/14
[52] U.S. Cl. .................................. 137/268; 239/310; 422/282; 422/264
[58] Field of Search ............... 137/268; 422/264, 266, 422/275, 281, 282; 239/310

[56] References Cited

U.S. PATENT DOCUMENTS 2,507,410 5/1950 Kemp .............................. 422/282 X
3,864,090 2/1975 Richards ......................... 239/310 X Primary Examiner—Alan Cohan
Attorney, Agent, or Firm—Howard H. Darbo

[57] ABSTRACT

Plant fertilizer in granular form is supplied as replaceable cartridges and gradually dissolved within the cartridge shell by a side branch of the main stream of water which flows straight through the base of the feeder with minimum pressure loss. The cartridge container is a frustoconical disposable shell the base closure of which has a central orifice for metering inflowing water and peripheral fertilizer solution outlet holes. A port in the top of the main channel directs the side branch flow against the cartridge closure at the metering orifice to flow into the body of fertilizer and a second port receives solution from outlet apertures in the closure to rejoin the main stream at an enlarged portion of the main channel to provide suction. A dome screwed into sealed engagement on the top of the feeder encloses the cartridge.

A safety valve is provided at the top of the dome to permit trapped air to escape through a central aperture.

8 Claims, 10 Drawing Figures

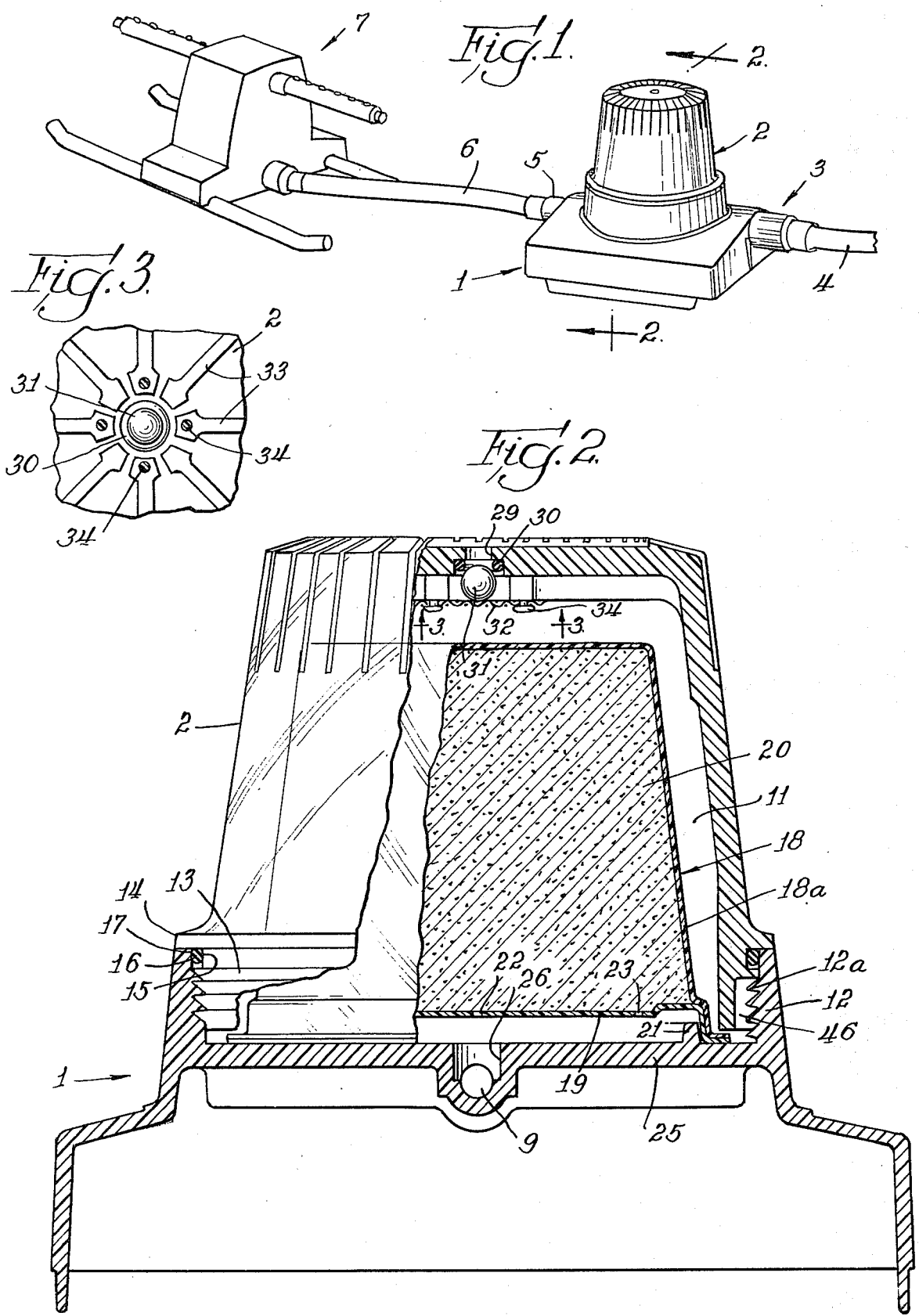

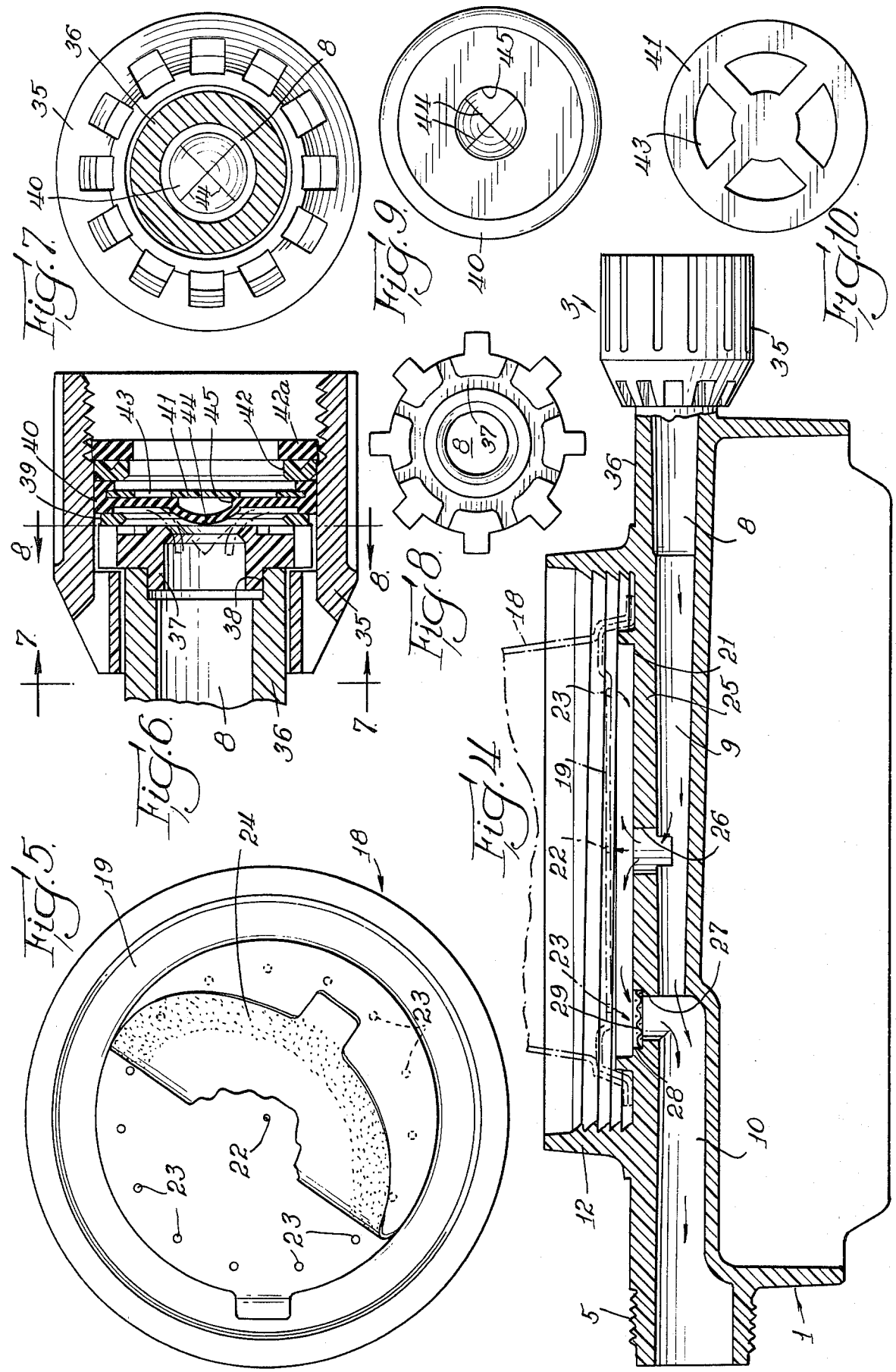

CARTRIDGE FEEDER FOR SOLUBLE FERTILIZER

BACKGROUND AND SUMMARY OF THE INVENTION

A wide variety of devices for feeding plant fertilizer to a continuously flowing stream of water are known. Such devices are used, for example, for fertilizing and sprinkling lawns and gardens. The fertilizer concentrate may be supplied in either solid or liquid form. All feeders include means for gradually feeding a solution of the fertilizer to the main stream of water as it passes on to the dispensing head of a sprinkler or sprayer. If the fertilizer is supplied in solid form, means must be provided for dissolving the solid material, either gradually as the solution is continuously fed to the main stream of water or as a batch-making step to be completed prior to feeding of the solution to the main stream. If the fertilizer is supplied as a concentrated solution, means are sometimes provided for diluting the solution prior to feeding to the main stream of water.

Generally, liquid fertilizer feeders include a removable or otherwise refillable container below the main channel body of the apparatus and by aspirating or other means cause the fertilizer solution to flow upwardly to the main stream of water. Mechanisms and structures, such as restricted passageways, may be provided to control the rate of flow of the solution to the main stream. Over long periods of use, small orifices tend to become partially or totally clogged.

The water sprayer of Wenzel U.S. Pat. No. 2,737,414 is an example of a fertilizer dispenser in which the base reservoir 4 is partly filled with solid material which is gradually dissolved by water flowing into the reservoir through a small passageway 26. The solution is then educted by suction created at nozzle tip 22 where it is incorporated in the water spray.

The liquid proportioning device of McNair U.S. Pat. No. 4,068,681 is an example of a feeder wherein solid fertilizer is dissolved as a first step in the operation of the feeder after which flow of the solution to the main stream of water is automatically started. This device, and the injector of Dulger, U.S. Pat. No. 3,421,738, employs rather complicated structures for dissolving and proportioning the flow of the fertilizer solution.

The liquid fertilizer feeder of the invention herein described is designed for connection in a lawn or garden hose for dissolving solid fertilizer, preferably in granular or powder form, at a controlled rate and supplying a dilute solution to a suitable sprinkler or sprayer for dispensing to the desired area. An object of the invention is to provide an improved device of this character which imposes minimum pressure loss so that water at essentially supply pressure may be continuously provided for the proper operation of the sprinkler or sprayer. An important object is to provide such a feeder wherein soluble fertilizer is supplied in disposable cartridges and a metering orifice is provided for controlling the rate of flow of water from a side branch stream into the supply body of fertilizer within the cartridge with means for conducting the solution back to the main stream of water whereby a continuous proportionate feeding of the liquid fertilizer is achieved. A feature of the design of the apparatus resides in the provision of the metering orifice in the cartridge container so that a new metering orifice element is put into use with each replacement of the solid fertilizer cartridge to ensure metering accuracy. Conveniently, the metering orifice and outlet solution apertures are provided in the closure of the cartridge.

Another object of the invention is to enhance the convenience of use of the feeder by locating the solid fertilizer supply on the top of the feeder, permitting access for replacement of the fertilizer cartridge while the feeder is resting upon the group or other surface. To this end, a removable watertight dome is provided as a cover for the fertilizer cartridge. An important feature of this arrangement is the provision of an air vent valve at the top of the dome to ensure against the accumulation of air which, when compressed under the influence of full water line pressure, could present a hazard in the event that the dome is not securely replaced upon the base of the feeder.

DESCRIPTION OF THE DRAWINGS

In the accompanying drawings,

FIG. 1 is a perspective view showing the liquid fertilizer feeder of the invention connected in series in the hose supplying water to a suitable (known) sprinkler;

FIG. 2 is a cross-sectional view of the feeder taken at line 2—2 of FIG. 1;

FIG. 3 is a detail view taken at the line 3—3 of FIG. 2 with the retaining screen removed to show the air vent valve structure;

FIG. 4 is a vertical, longitudinal cross-sectional view of the feeder, the position of the solid fertilizer supply cartridge being indicated in dashed lines;

FIG. 5 is a bottom view of a fertilizer supply cartridge with the sealing label partly pulled away to show the metering orifice and solution outlet apertures in the closure of the cartridge;

FIG. 6 is an enlarged detail view, in cross section, of the water inlet check valve;

FIGS. 7 and 8 are cross-sectional views taken respectively at the lines 7—7 and 8—8 of FIG. 6, and FIGS. 9 and 10 show individual parts of the check valve.

DESCRIPTION OF EXAMPLE EMBODYING BEST MODE OF THE INVENTION

The liquid fertilizer feeder of the invention comprises, generally, a base 1, which may be produced as a single, unitary plastic molding, and a dome 2 which is removably secured to the base. The base has a low profile so that the feeder can rest in stable upright position upon the ground and need not be picked up to remove the dome in order to load a new cartridge of fertilizer into the feeder. The dome must be strong enough to withstand the relatively high pressures, possibly to 100 p.s.i., under which water is supplied to the feeder and is preferably transparent. A coupling 3 for attachment of water supply hose 4 is provided at the inlet end of base 1 and a threaded snout 5 is provided at the outlet end of the base for connection of a length of hose 6 which serves to couple the feeder with a lawn sprinkler to supply water containing dissolved fertilizer from the feeder to the sprinkler.

Lawn sprinkler 7 constitutes no part of the invention and being of known construction, it will be no further described herein. It may be noted, however, that the sprinkler chosen by way of illustration is an especially efficient dispenser of water and liquid fertilizer which operates best when water under at least moderately high pressure is supplied. It is relevant to the invention, then, as an illustration of the desirability of minimizing the loss of water pressure as the stream of water passes through the fertilizer feeder.

An aspect of the simplicity of the feeder of the invention is demonstrated by the unitary nature of base 1 which can be molded from a suitable plastic material, such as acrylonitrile, butadiene, or a suitable styrene. An unobstructed, straight-through passageway 8 is provided from the inlet to the outlet end of the base. Section 9 of this passagway converges slightly to provide necessary molding draft and, as will be further explained hereinafter, to provide side branch flow pressure, while section 10 of the passageway flares sufficiently to provide molding draft and, in accordance with well-known venturi principles, to recover in large part pressure loss resulting from flow through converging section 9.

A solid fertilizer supply chamber 11 is formed on top of base 1 by dome 2 which screws into internally threaded circular flange 12 formed atop base 1 integrally therewith. The open bottom portion of the frustoconical dome is provided with threads 13 and a circumferential shoulder 14 which serves as a stop when the dome has been screwed into closed position at which shoulder 14 engages the top of circular flange 12. A circumferential groove 15 between threaded portion 13 and shoulder 14 accommodates an O-ring 16 which provides a watertight seal as it is squeezed between the bottom of slot 15 and the generally cylindrical surface 17 which is provided above threads 12a on the inside at the top of circular flange 12. Actually, the surface 17 converges slightly downwardly so that the O-ring seal tightens as the dome is screwed into position.

The profile of solid fertilizer cartridge 18 is shown in FIG. 2 and the plan of the permanent cartridge closure 19 is shown in FIG. 5. The frustoconical inverted cup container 18a, preferably of thin transparent plastic, initially filled with granular solid fertilizer material 20, is smaller than the interior of dome 2, being covered thereby. The cartridge is loosely seated with the bottom, closured end of the cartridge surrounding circular flange 21 which is formed integrally with base 1 of the feeder. As will be seen, when supply water is turned on, the entire space within the dome is open to the water so that line pressure exists both within and without the cartridge and container 18a needs to be only strong enough to hold the solid fertilizer.

As is seen in FIGS. 2, 4 and 5, cartridge closure 19 is provided with a centrally located metering orifice 22 and a plurality of peripheral solution outlet apertures 23. To provide a closed package for shipment and storage pending use, closure 19 of the solid fertilizer cartridge is covered with a pressure adhesively secured label 24 which covers orifice 22 and apertures 23 until pulled away, as indicated in FIG. 5, to expose these openings prior to loading of the cartridge into the feeder.

As is seen in FIGS. 2 and 4, the solid fertilizer cartridge merely rests upon the top wall 25 within circular flange 12 of the feeder base.

A side branch port 26 is provided at the top of passageway section 9 coaxially with cartridge 18 and metering orifice 22. A return side branch port 27 is provided at the top of the inlet end of section 10 of the passageway, a counterbore 28 at the top of port 27 providing accommodation for a small round screen 29.

As indicated by the flow arrows, a small portion of the stream of water flowing into passageway 8 of the feeder is permitted to branch off through port 26 to initiate a side branch stream which, flowing first upwardly, impinges against closure 19 at metering orifice 22, providing a kinetic pressure tending to force water into the interior of the cartridge. The rest of the side branch stream is free to flow along under closure 19 toward return port 27. The cross section of section 10 of the main water passageway being considerably enlarged at the location of return side branch port 27, relative suction is imposed at this point tending to draw water downwardly from the space above. In this way, flow is induced in a side branch stream which includes passage of water into the mass of granular solid fertilizer and thence to outlet apertures 23 substantially saturated with dissolved fertilizer. This solution, along with water which may bypass directly from port 26 to side branch outlet port 27, then rejoins the main stream of water in section 10 of the passageway, providing the desired proportionate amount of fertilizer in the water supplied to sprinkler 7.

The amount of water permitted to pass through metering orifice 22 into the supply of solid granular fertilizer is proportional to the size of this orifice. The larger the orifice, the greater the flow of water through the solid fertilizer material to dissolve a portion of the same before again flowing out of the cartridge container and through return side branch port 27. In this way, the rate of dissolution of solid fertilizer can be predetermined by appropriately sizing the metering orifice. This control is desirable in view of differing solubilities of different solid fertilizer materials and also to provide optimum concentration of the fertilizer in the water supplied to the sprinkler.

Screen 29 serves to prevent the passage of undissolved solid fertilizer granules or insoluble particles into the stream of water supplied to the sprinkler.

As is seen in FIG. 2, an aperture 29 is provided at the center of the top of dome 2 and a valve normally preventing flow to this aperture is arranged immediately under it. The purpose of this valve is to permit air trapped in the top of the dome to escape while preventing water to flow out through aperture 29. A circular valve seat 30 surrounds the open bottom of the aperture and a buoyant ball 31 is retained in position by a screen 32 which is permanently fastened to the ends of reinforcing ribs 33 in the top of the dome by means of integral plastic posts 34. The spacing of the screen from the valve seat 30 is such that ball 31 may drop away from the seat to open the valve when the water level is sufficiently low and to again engage the seat to close the valve when air has escaped sufficiently to permit the water to move the floating ball upwardly into closed position of the valve.

When the feeder water supply has been turned off, air is permitted to enter chamber 11 through aperture 29 so that the water therein may drain out through ports 26 and 27 and thus render reloading of the feeder with a new cartridge more convenient.

The inlet end of base 1 of the feeder is fitted with the usual female hose coupling 35 which also serves as a housing for a check, anti-siphoning valve. The coupling is retained in rotatable position upon the snout 36 which forms the inlet end of passageway 8 by means of generally washer-shaped plug 37 which is press fitted into counterbore 38 at the end of snout 36. A narrow, relatively hard washer 39 engages the peripheral margin of plug 37 and a rubber valve diaphragm 40 with its associated plate valve seat 41 is interposed between washer 39 and a second washer 42. The latter washer is also composed of relatively rigid, hard plastic material and is "V" shaped in cross section to firmly engage the interior cylindrical surface of coupling 35 to retain the valve assembly in position. Rubber washer 42a is the usual aid to connecting the male end of a hose to the feeder.

Plate valve seat 41 is shown separately in FIG. 10. It is provided with openings 43 through which water may flow. In the normal operation of the feeder, as water is supplied under pressure rubber diaphragm 40 is pushed away from valve plate 41 to the dashed line position shown in FIG. 6 so that water can flow freely through openings 43. Crossed slits 44 permit the four quadrants of thin rubber to flare outwardlly and permit the passage of water through the central opening 45 in the main body of diaphragm 40. When supply water is turned off and flow pressure drops to zero, diaphragm 40 returns to its normal position against valve plate 41 and, in the event a pressure differential tending to cause water to flow back into hose 4, the check valve will close more tightly and prevent such flow.

If, in the operation of the liquid fertilizer feeder, more than one cartridge of fertilizer is desired to be dispensed, exhaustion of the cartridge in the feeder may be seen through the transparent dome and cartridge container and the supply water may be turned off to reload the feeder. The pressure within the dome normally decreases promptly and water tends to drain by gravity through ports 26 and 27 and to the sprinkler. However, as a precaution against surprise outflow when the threads disengage as the dome is screwed off, slots 46 are cut across threads 13 at the bottom of the dome so that any residual pressure in the dome may be relieved through these slots. When the dome has been removed, the empty cartridge container may be lifted out of the feeder and a full replacement cartridge placed in position and the dome again screwed down tightly.

Sprinkling may be continued with clear water for an indefinite time after all of the solid fertilizer has been dissolved out of the cartridge container.

ACHIEVEMENT

The liquid fertilizer feeder of the invention herein disclosed in functionally efficient, structurally convenient to use, and simple in design and operation for long, trouble-free service.

Departing from time-honored practice, the solid chemical supply chamber is located on top of a broad, low profile base which rests in stable state upon the ground. It is not necessary to lift the feeder to reload it with solid fertilizer. The dome may be unscrewed from the base, the empty plastic container removed and replaced with a new cartridge, and the dome screwed back onto the base to ready the feeder for further use. Normally, the water in the chamber under the dome will have drained out by gravity; if not, it will escape as the dome is disengaged from the base.

While the water admitted to the interior of the cartridge is metered to permit dissolution of the solid chemical at a predetermined rate, there is no problem of meter orifice maintenance since a new orifice is installed with each new cartridge. And it is possible to provide differing predetermined rates of flow of water into the solid fertilizer container by dimensioning the metering orifice as desired.

The cartridge container may be made inexpensively of plastic film since water pressures outside and inside of the container in the feeder are equal and strength of container to resist pressure is not needed. Also, the empty containers may be thrown away without appreciable economic loss.

The base of the feeder, as well as the dome, may be produced as a single, integral molding and can thus be mass produced at low cost. The main stream passageway through the feeder base is straight through and unobstructed so that water pressure loss is minimized and substantially line pressure may be supplied for efficient operation of the sprinkler.

We claim:

1. A liquid fertilizer feeder comprising a base adapted to rest in stable upright position upon the ground and having a main water passageway therethrough, a fertilizer supply cartridge comprising a closed container containing granular solid fertilizer disposed atop said base, said cartridge container comprising an inverted frustoconical cup of plastic film and a flat closure for the otherwise open bottom thereof, the bottom of said container having a metering orifice and a solution outlet aperture at spaced apart locations therein, said metering orifice being located at the center of said closure and said solution outlet aperture being one of several apertures spaced around the periphery of said closure, a cover removably secured to the top of said base and providing with said base a watertight enclosure for said cartridge, said passageway having a converging inlet section and a diverging outlet section and a side branch inlet port and a side branch return port at spaced apart locations of said converging and diverging sections, respectively, in the top of said passageway and opening directly into said watertight enclosure, said inlet port being located upstream from said return port and directly under said metering orifice whereby a side branch water stream is directed from said inlet port against said cartridge container at said metering orifice to cause water to flow therethrough into the body of granular fertilizer within said container, said return port being open to said outlet aperture in said container whereby fertilizer solution may flow through said aperture and said return port into said main water passageway, and means atop said base and integral therewith for locating and retaining said cartridge coaxially with said side branch inlet port.

2. A liquid fertilizer feeder in accordance with claim 1 wherein said base includes a horizontal top wall and a threaded circular flange rising from said wall and said cover comprises a dome having the bottom portion thereof threaded to mate with said threaded flange whereby said dome is secured to said base by screwing the same downwardly to closed position.

3. Structure in accordance with claim 2 wherein said dome is composed of transparent plastic material.

4. Structure in accordance with claim 2 wherein said dome has an air escape aperture at the top thereof and an air venting valve at said air escape aperture within said dome.

5. Structure in accordance with claim 2 wherein a generally cylindrical surface is provided internally of said circular flange at the margin above the threaded portion thereof and said dome is provided with a circumferential groove in the bottom portion thereof above said threaded portion, and an O-ring is arranged in said groove and adapted to engage said generally cylindrical surface to seal the joint between said dome and said base against the escape of water when said dome is screwed down to closed position.

6. A liquid fertilizer feeder comprising a base adapted to rest in stable upright position upon the ground and having a main water passageway therethrough, a fertilizer supply cartridge comprising a closed container containing granular solid fertilizer disposed atop said base, said cartridge resting upon said base without being sealed thereto whereby water may flow between said cartridge and said base within said watertight enclosure, the bottom of said container having a metering orifice and a solution outlet aperture at spaced apart locations therein, a cover removably secured to the top of said base and providing with said base a watertight enclosure for said cartridge, said passageway having a converging inlet section and a diverging outlet section and a side branch inlet port and a side branch return port at spaced apart locations of said converging and diverging sections, respectively, in the top of said passageway and opening directly into said watertight enclosure, said inlet port being located upstream from said return port and directly under said metering orifice whereby a side branch water stream is directed from said inlet port against said cartridge container at said metering orifice to cause water to flow therethrough into the body of granular fertilizer within said container, said return port being open to said outlet aperture in said container whereby fertilizer solution may flow through said aperture and said return port into said main water passageway.

7. A liquid fertilizer feeder in accordance with claim 6 wherein said cartridge container comprises an inverted frustoconical cup of plastic film.

8. Structure in accordance with claim 5 wherein a pressure relief slot is provided across said threaded bottom portion of said dome.

* * * * *